(12) United States Patent
Wang

(10) Patent No.: US 11,060,502 B2
(45) Date of Patent: Jul. 13, 2021

(54) MULTI-LAYER VERTICAL WIND-DRIVEN GENERATOR SET STRUCTURE

(71) Applicant: Cheng-Jyun Wang, New Taipei (TW)

(72) Inventor: Cheng-Jyun Wang, New Taipei (TW)

(73) Assignee: Cheng-Jyun Wang, New Taipei (TW)

(*) Notice: Subject to any disclaimer, the term of this patent is extended or adjusted under 35 U.S.C. 154(b) by 115 days.

(21) Appl. No.: 16/212,710

(22) Filed: Dec. 7, 2018

(65) Prior Publication Data
US 2020/0040871 A1 Feb. 6, 2020

(30) Foreign Application Priority Data
Aug. 3, 2018 (TW) ................................ 107127175

(51) Int. Cl.
*F03D 3/06* (2006.01)
*F03D 3/00* (2006.01)

(52) U.S. Cl.
CPC ............. *F03D 3/061* (2013.01); *F03D 3/005* (2013.01); *F05B 2240/211* (2013.01); *F05B 2240/90* (2013.01); *F05B 2250/712* (2013.01)

(58) Field of Classification Search
CPC .... F03D 3/061; F03D 3/005; F05B 2250/712; F05B 2240/90; F05B 2240/211; Y02E 10/74
See application file for complete search history.

(56) References Cited

U.S. PATENT DOCUMENTS

| 7,303,369 B2* | 12/2007 | Rowan | F03D 3/062 415/4.2 |
| 7,896,609 B2* | 3/2011 | Mitchell | F03D 3/005 415/4.2 |
| 10,648,452 B1* | 5/2020 | Galstyan | F03D 3/0409 |
| 2004/0265116 A1* | 12/2004 | Kaneda | F03D 3/0409 415/4.2 |
| 2006/0198724 A1* | 9/2006 | Bertony | F03D 3/005 415/4.4 |
| 2008/0085179 A1* | 4/2008 | Kinkaid | F03D 3/0454 415/4.1 |
| 2012/0292912 A1* | 11/2012 | Haskell | F03D 9/25 290/55 |

FOREIGN PATENT DOCUMENTS

WO WO-2012072007 A1 * 6/2012 ............. F03D 3/061

* cited by examiner

*Primary Examiner* — Michael C Zarroli

(57) ABSTRACT

A vertical wind-driven generator blade comprising: a bracket with a generator unit therein, the upper end of the bracket is provided with a blade set, the blade set includes a connecting shaft, two connecting pieces at least and at least two blades, and the lower end of the connecting shaft of the lowermost blade set is connected to the generator unit, and the connecting shaft is axially provided with two connecting pieces at least around the upper end of the bracket, which is radial and formed into a concave arc shape at the same direction; each blade is extended to a unit large blade or more at the length and height direction, and assembled into the vertical wind-driven generator with two large blades at least. With this structure, the present invention can effectively improve the generated power and the operation convenience.

10 Claims, 14 Drawing Sheets

MULTI-LAYER VERTICAL WIND-DRIVEN GENERATOR SET STRUCTURE

BACKGROUND OF INVENTION

1. Field of the Invention

The present invention relates to a generator blade, and more particularly to a vertical blade set which is connected with the generator unit at an upper end of the bracket of the generator unit, the blade set comprises of a connecting shaft or two connecting pieces at least, and the connecting shaft or the connecting piece is provided with at least two blades, or a vertical wind-driven generator blade of the supporting body.

2. Description of Related Art

In order to achieve nuclear-free homes, it is developing towards thermal power or wind power generation. For thermal power generation, it must have a safety stock concept. In order to make the thermal power generation stable, it is necessary to have a safety stock of fuel, such as oil, natural gas or coal. But due to the non-green energy power generation, the fuel may be shut down due to the interruption or lack of imported oil, natural gas or coal, or the shortage of safety stocks, seriously affecting the supply for power generation, and such fuel used for non-green energy power generation will cause the greenhouse effect and PM2.5 particles, which have great damage to the earth and human living environment.

Therefore, wind power generation has been developed for green energy. As the blade is the horizontal wind-driven generator blade, and the blade's camber angle cannot reach the ideal 90°, the wind from the direction other than the specific direction could not be utilized. The blades cannot be started by the wind with low speed in a specific direction because of the influence of the blade camber angle. In order to make the blades of the horizontal wind-driven generator towards the wind in a specific direction and provide the wind to the blades of the horizontal wind-driven generator for running effectively, the blade top of the horizontal wind-driven generator is provided with a directional controller to detect the main wind direction. In addition to the directional controller, the blades of the horizontal wind-driven generator need to have a complicated direction change control mechanism between the blade and the support cylinder, which can make the blades of the horizontal wind-driven generator towards the wind in a specific direction, so the horizontal wind-driven generator is expensive, the repair and maintenance take time and energy, and also it takes the time and to find and provide wind field exceeding a certain wind speed and land. The blades of the horizontal wind-driven generator cannot run in the low wind speed, and the blades of the horizontal wind-driven generator can only extend in the length direction. The blades cannot extend to a high place for assembling a vertical wind-driven generator, so it is necessary to cost a large number of horizontal wind-driven generators to increase its power. The applicability of the source of national green energy cannot be effectively achieved, and its large-scale construction will affect the health and environment of residents in the vicinity of horizontal wind-driven generator, which has greatly reduced its practicality. This is a breakthrough for the technical staff and consumers.

SUMMARY OF THE INVENTION

To overcome the above deficiency of existing technology, the present invention mainly aims to provide a kind of vertical wind-driven generator blade, which is connected with the generator unit at an upper end of the bracket of the generator unit, the blade set comprises of a connecting shaft or two connecting pieces at least, and the connecting shaft or the connecting piece is provided with at least two blades, or a supporting body, in order to overcome the difficulty of existing technology.

Secondarily, the present invention aims to provide a kind of vertical wind-driven generator blade that does not require a directional controller for a horizontal wind-driven generator and a complicated direction change control mechanism, that is, the blade set can be started at a low wind speed and in any direction. The blades of the horizontal wind-driven generator can only extend in the length direction, and the blades cannot extend to a high place for assembling a vertical wind-driven generator. The blades of the present invention can be assembled at any length and any height under the conditions of safety, technology and cost, they can be extended to the length and height direction to assemble a vertical wind-driven generator, which can save the wind field, reduce the cost of land and reduce the impact on the general resident environment.

Also, the present invention aims to provide a kind of vertical wind-driven generator blade that can effectively increase the generated power and convenience of operation.

The problem to be solved by the present invention is that, according to the blades of the horizontal wind-driven generator, and the blade's camber angle cannot reach the ideal 90°, the wind blown in the direction other than the specific direction could not be utilized. The blades cannot be started by the wind with low speed in a specific direction because of the influence of the blade camber angle. In order to make the blades of the horizontal wind-driven generator towards the wind in a specific direction and provide the wind to the blades of the horizontal wind-driven generator for running effectively, the blade top of the horizontal wind-driven generator is provided with a directional controller to detect the main wind direction. In addition to the directional controller, the blades of the horizontal wind-driven generator need to have a complicated direction change control mechanism between the blade and the support cylinder, which can make the blades of the horizontal wind-driven generator towards the wind in a specific direction, so the horizontal wind-driven generator is expensive, the repair and maintenance take time and energy, and also it takes the time and to find and provide wind field exceeding a certain wind speed and land. The blades of the horizontal wind-driven generator cannot run in the low wind speed, and the blades of the horizontal wind-driven generator can only extend in the length direction. The blades cannot extend to a high place for assembling a vertical wind-driven generator, so it is necessary to cost a large number of horizontal wind-driven generators to increase its power. The applicability of the source of national green energy cannot be effectively achieved, and its large-scale construction will affect the health and environment of residents in the vicinity of horizontal wind-driven generator, which has greatly reduced its practicality.

In order to achieve the above object, the present invention provides a vertical wind-driven generator blade, comprising: a bracket with a generator unit therein, the upper end of this bracket is provided with a blade set, the blade set includes a connecting shaft and at least two blades (the three blades are preferred), and the lower end of the connecting shaft of the lowermost blade set is connected to the generator unit, and the connecting shaft is axially provided with at least two blades around the upper end of the bracket (the three blades are preferred), which is radial and forms a concave arc in the same direction.

Wherein, the blade set of the present invention has two blades and one end at least or the opposite angle of two blades is not provided or provided with a support body at least.

Wherein, the generated power of the blade set of the present invention is proportional to the volume of the at least two blades, and the volume is equal to the blade swept area multiplied by the blade height.

Wherein, the blade set of the present invention has at least two blades curved in a concave arc shape angle of more than 0° to less than 360°.

Wherein, the blade set of the present invention has at least two blades curved in a concave arc shape at an angle greater than 0° to 80° or 80° to 90° or greater than 90° to less than 360°.

In order to achieve the above object, the present invention provides a vertical wind-driven generator blade, comprising: a bracket with a generator unit therein; the upper end of this bracket is provided with a blade set at least, the blade set includes a connecting shaft, two connecting pieces and at least two blades (the three blades are preferred), and the lower end of the connecting shaft of the lowermost blade set is connected to the generator unit, and the connecting shaft is axially provided with two radial connecting pieces at least around the upper end of the bracket, The two connecting pieces are connected with two blades provided through the fixture and formed into a concave arc shape in the same direction, and each blade is extended to the height direction to form one of the large blades of one unit (inclusive) or more in a unit blade as requireds (any length and height under the conditions of safety, technology and cost, etc.), and assembled into a vertical wind-driven generator with two large blades at least.

Wherein, the blade set of the present invention has at least two blades curved in a concave arc shape angle of more than 0° to less than 360°.

Wherein, the blade set of the present invention has at least two blades curved in a concave arc shape at an angle greater than 0° to 80° or 80° to 90° or greater than 90° to less than 360°.

Wherein, the blade set of the present invention has two blades and one end at least or the opposite angle of two blades is not provided or provided with a support body at least.

Wherein, the generated power of the blade set of the present invention is proportional to the volume of the at least two blades (the three blades are preferred), and the volume is equal to the blade area multiplied by the blade height.

Comparison with the prior technical efficacy, according to this structure, the upper end of the bracket with the generator unit is provided with one blade set at least connected to the generator unit, and each blade set includes a connecting shaft or two connecting pieces at least, and the connecting shaft or the connecting piece is provided with at least two blades (three blades are preferred), or a supporting body; in addition, it is achieved that the direction controller of the horizontal wind-driven generator and the complicated direction change control mechanism are not required, so that the wind-driven generator can be started at a low wind speed, and the blade set can be started by the wind in any direction, and the blades of the horizontal wind-driven generator can only extend in the length direction, and the blades cannot extend to a high place to assemble the vertical wind-driven generator. The blade of the present invention is assembled in the unit blade at any length and any height under the conditions of safety, technology and cost, and it can be extended to form one large blade of one unit (inclusive) or more in the direction of the length and the height, and assembled into the vertical wind-driven generator with two large blades at least (three blades are preferred), which can save the wind field, reduces the cost of land and reduces the impact on the general residential environment, effectively increase the generated power capacity and operation convenience, and which will greatly expand the utilization of the industry. And it is novel and progressive.

DETAILED DESCRIPTION OF THE PREFERRED EMBODIMENT

Further benefits and advantages of the present invention will become apparent after a careful reading of the detailed description with appropriate reference to the accompanying drawings.

Figure 1A:
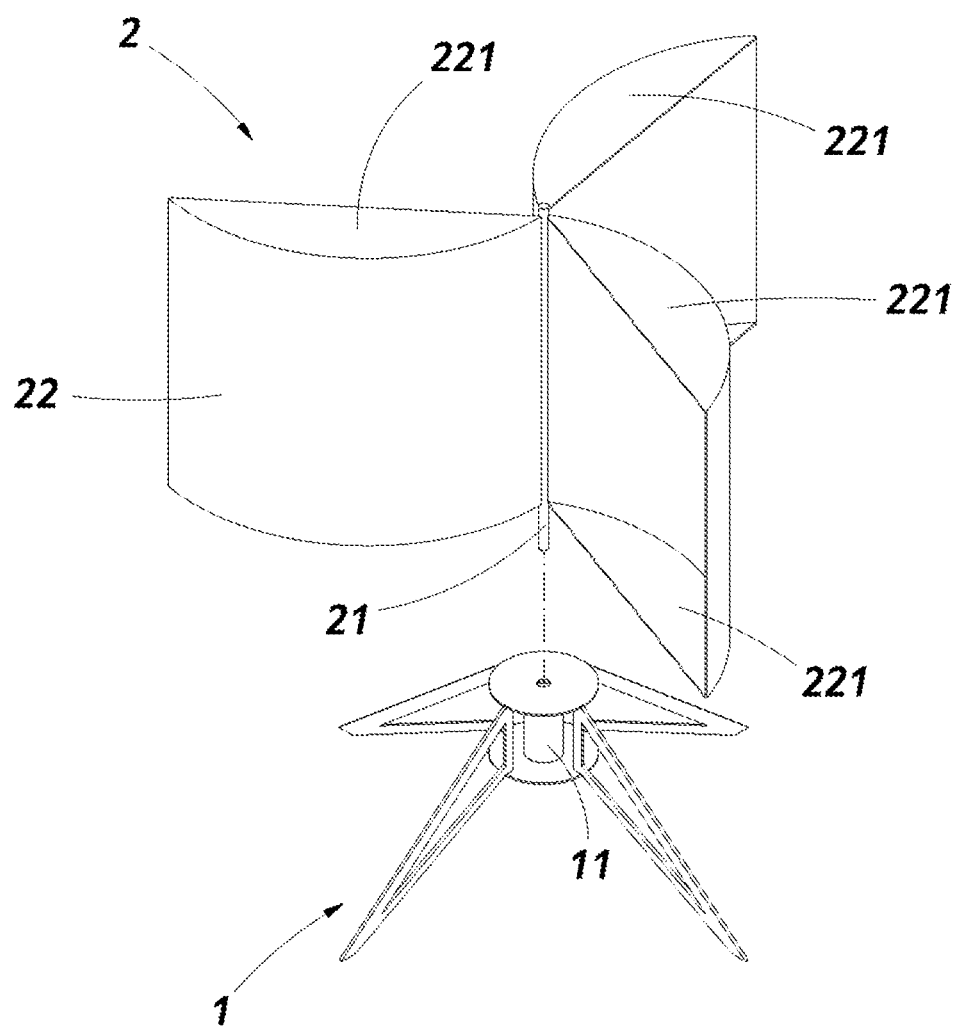
FIG. 1A is a vertical decomposition diagram of a single blade set with a support body of the present invention.
Figure 1B:
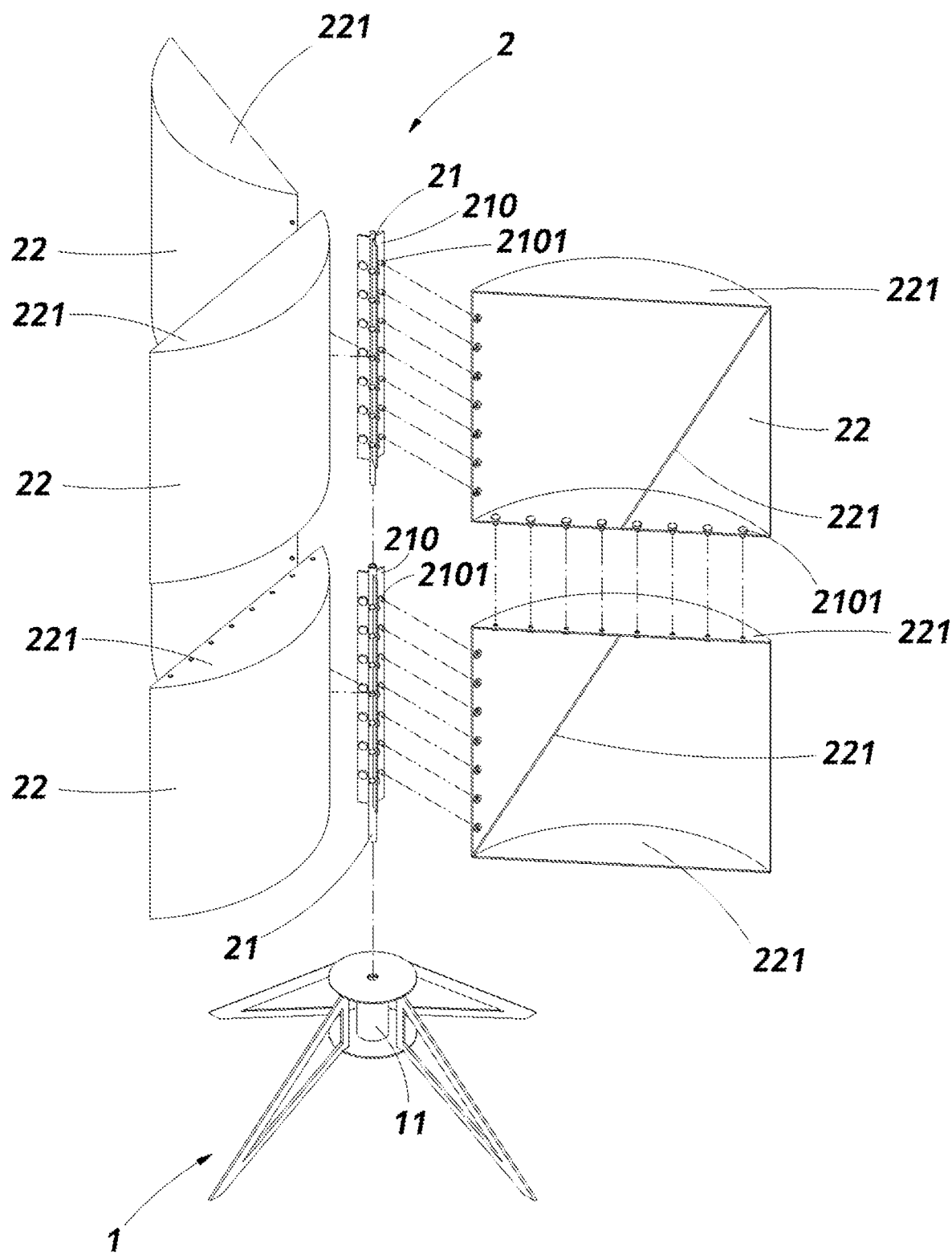
FIG. 1B is a vertical decomposition diagram of two blade sets at least with support body of the present invention.
Figure 2A:
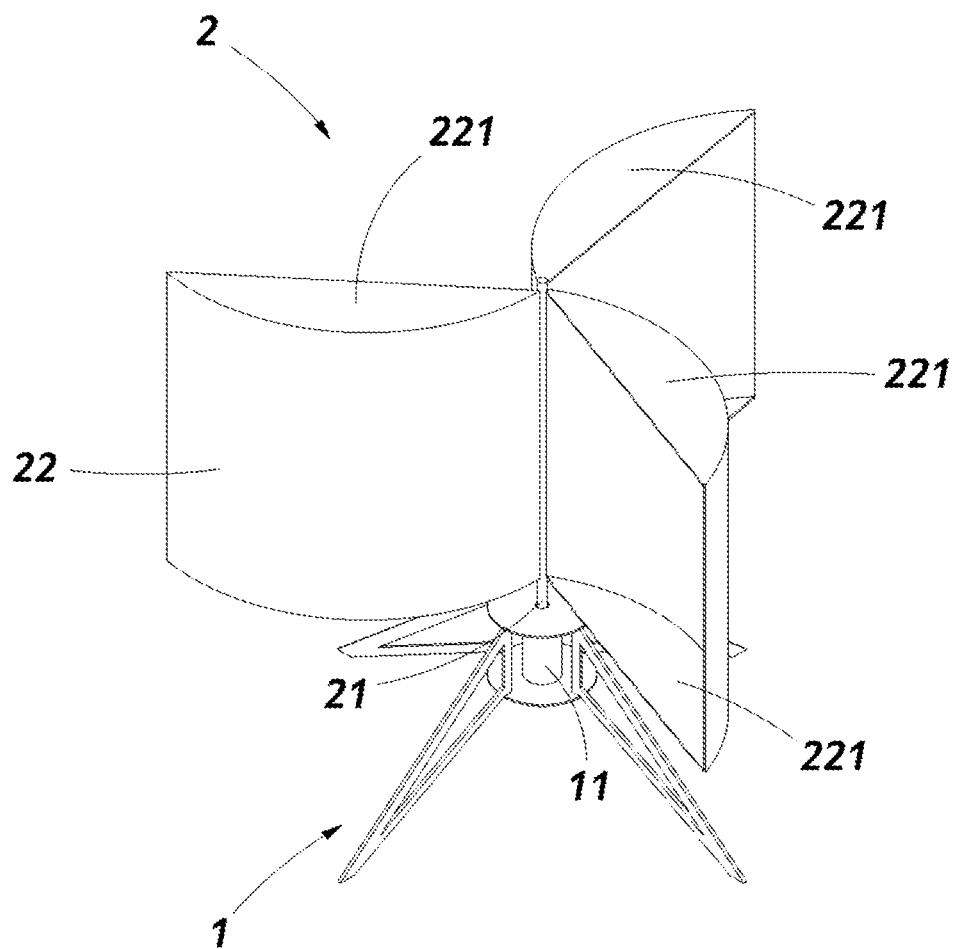
FIG. 2A is a vertical composition diagram of a single blade set with a support body of the present invention.
Figure 2B:
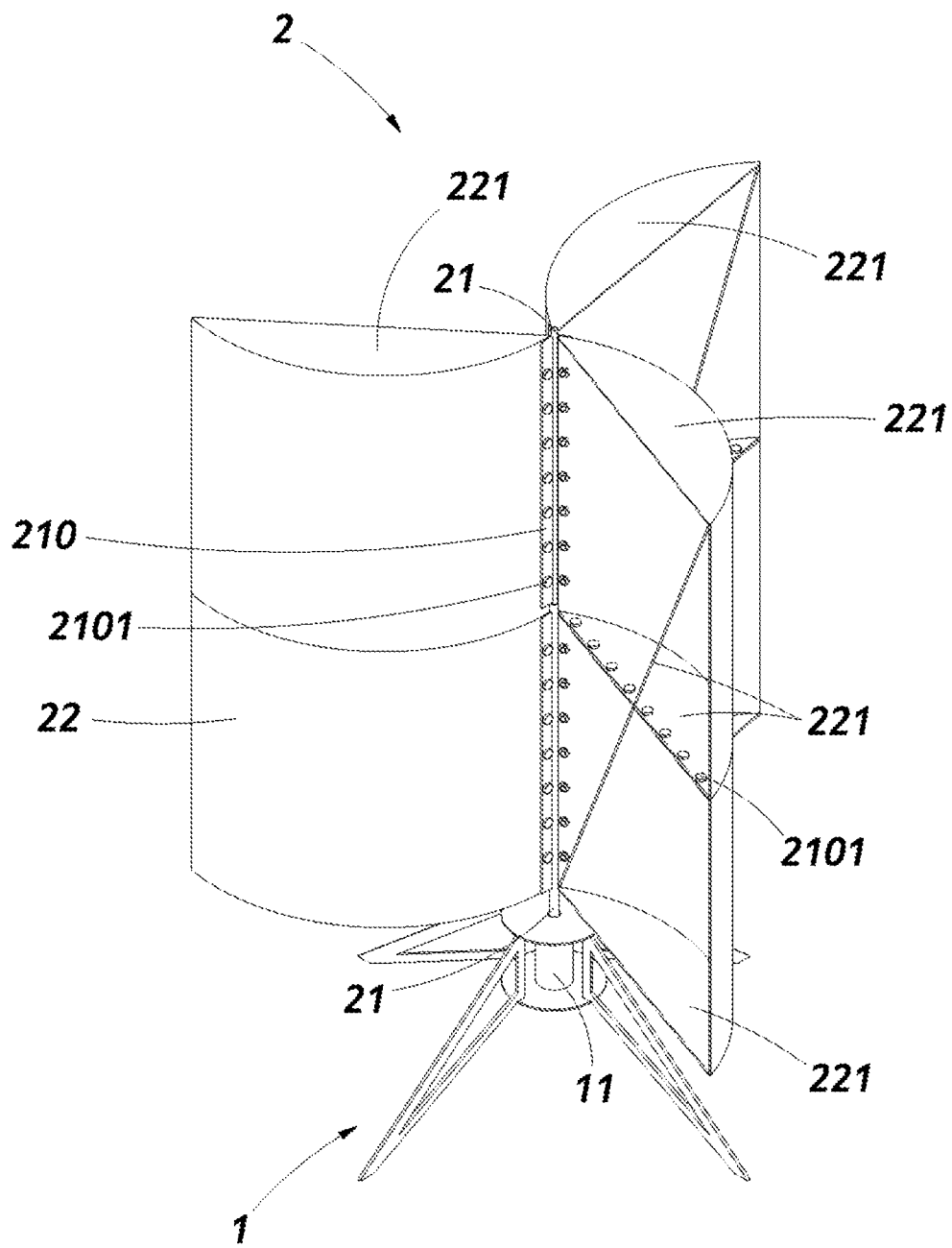
FIG. 2B is a vertical composition diagram of two blade sets at least with support body of the present invention.
Figure 3A:
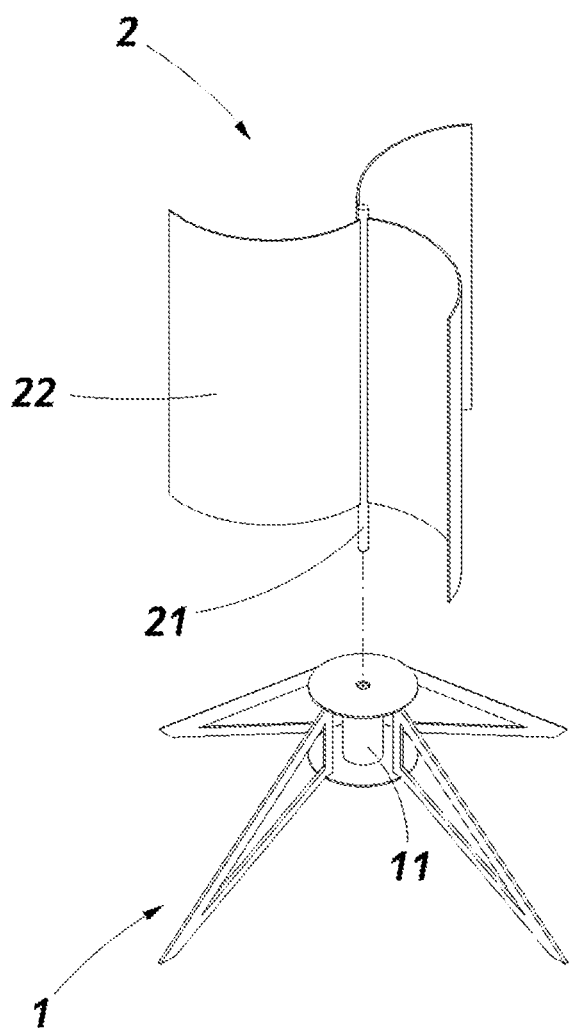
FIG. 3A is a vertical decomposition diagram of a single blade set of the present invention.
Figure 3B:
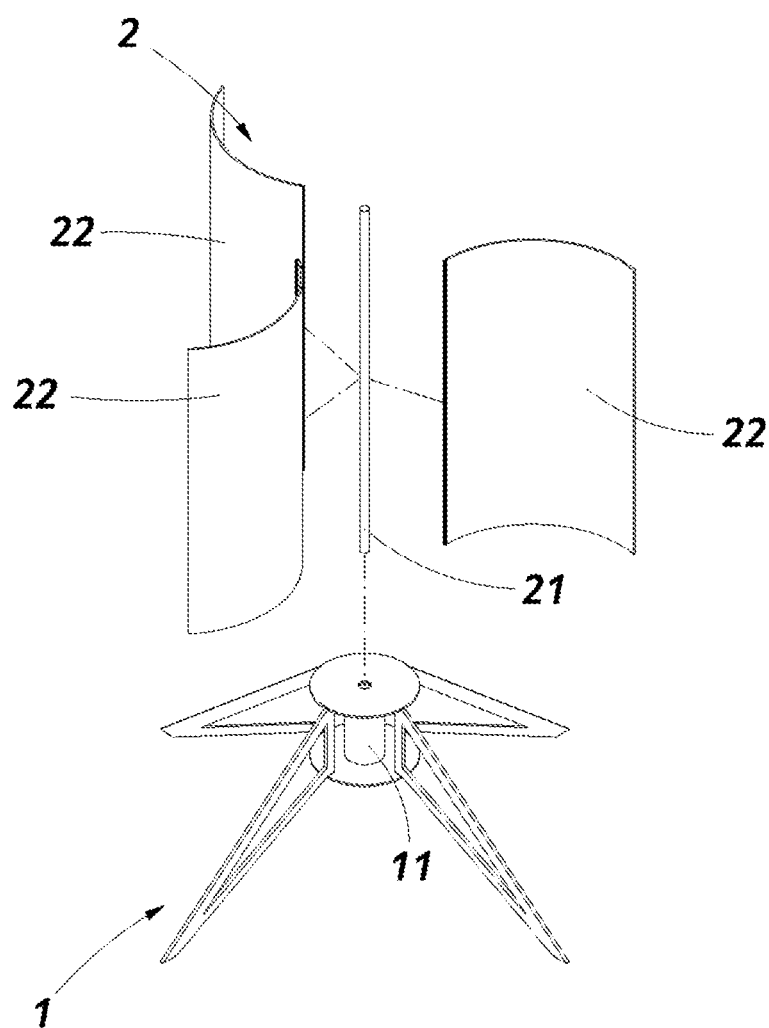
FIG. 3B is a vertical decomposition diagram of another embodiment of a single blade set of the present invention.
Figure 4A:
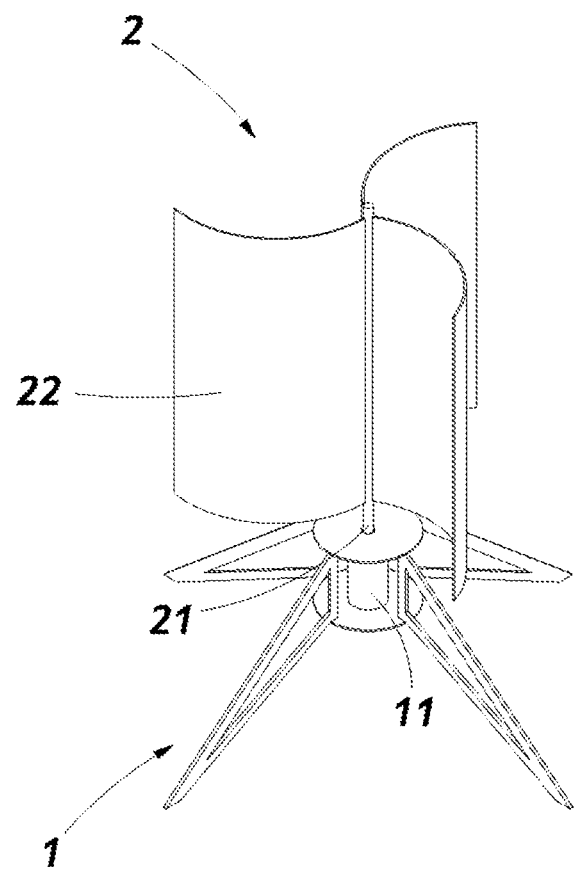
FIG. 4A is a vertical composition diagram of a single blade set of the present invention.
Figure 4B:
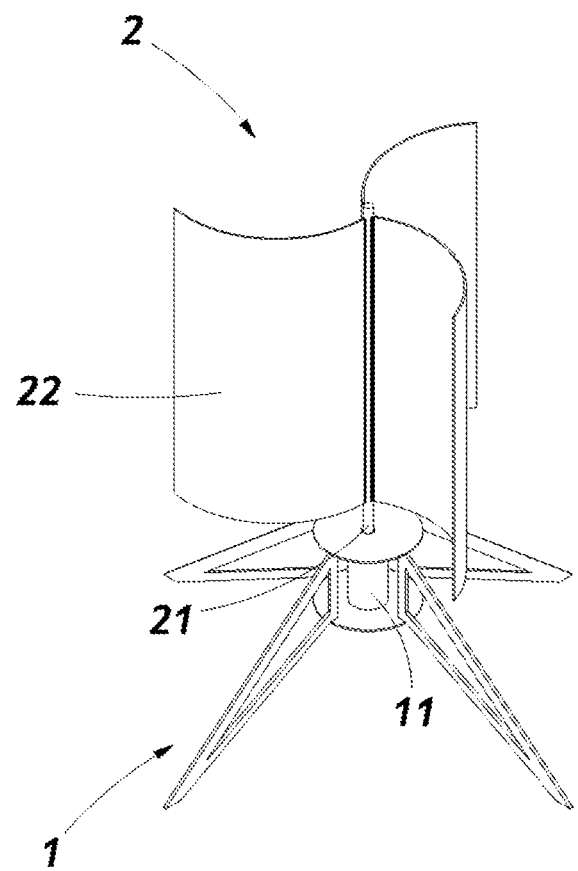
FIG. 4B is a vertical composition diagram of another embodiment of a single blade set of the present invention.
Figure 5A:
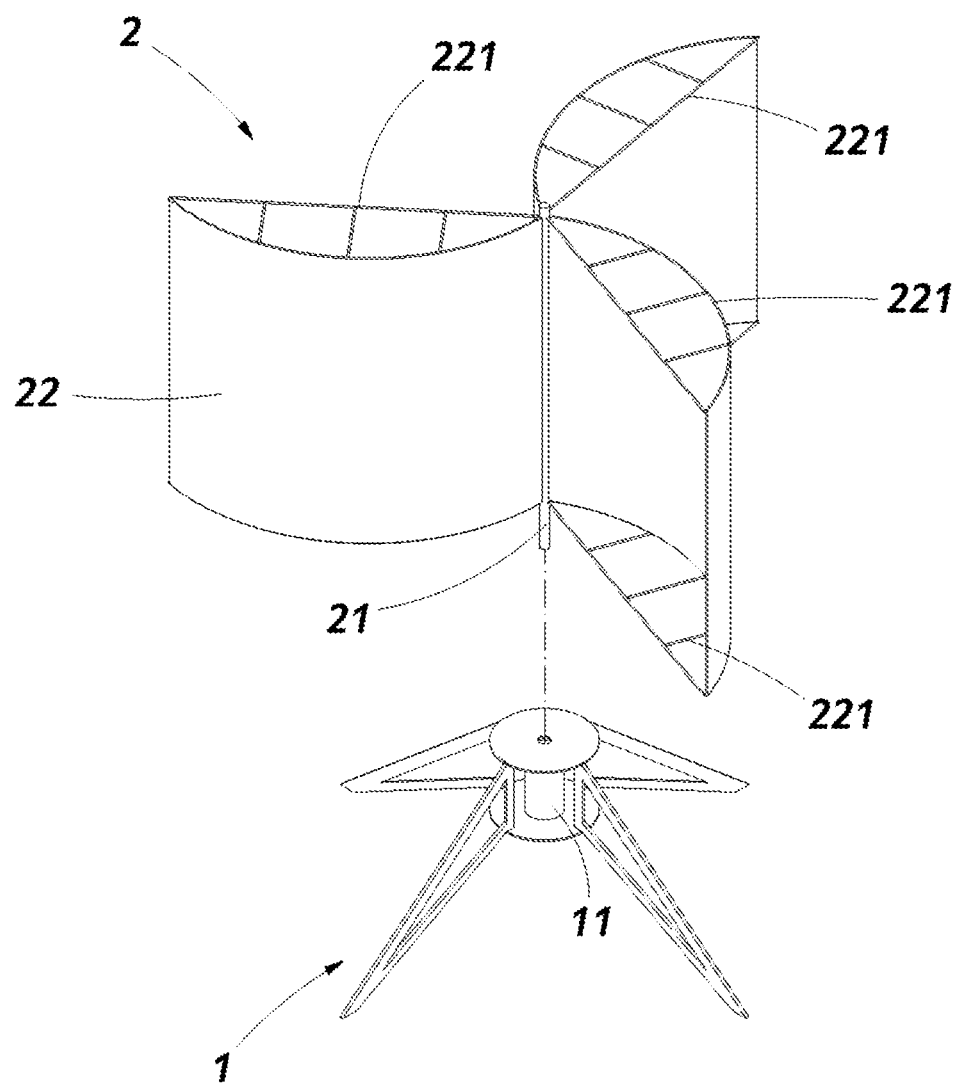
FIG. 5A is a vertical decomposition diagram of another embodiment of a single blade set with support body of the present invention.
Figure 5B:
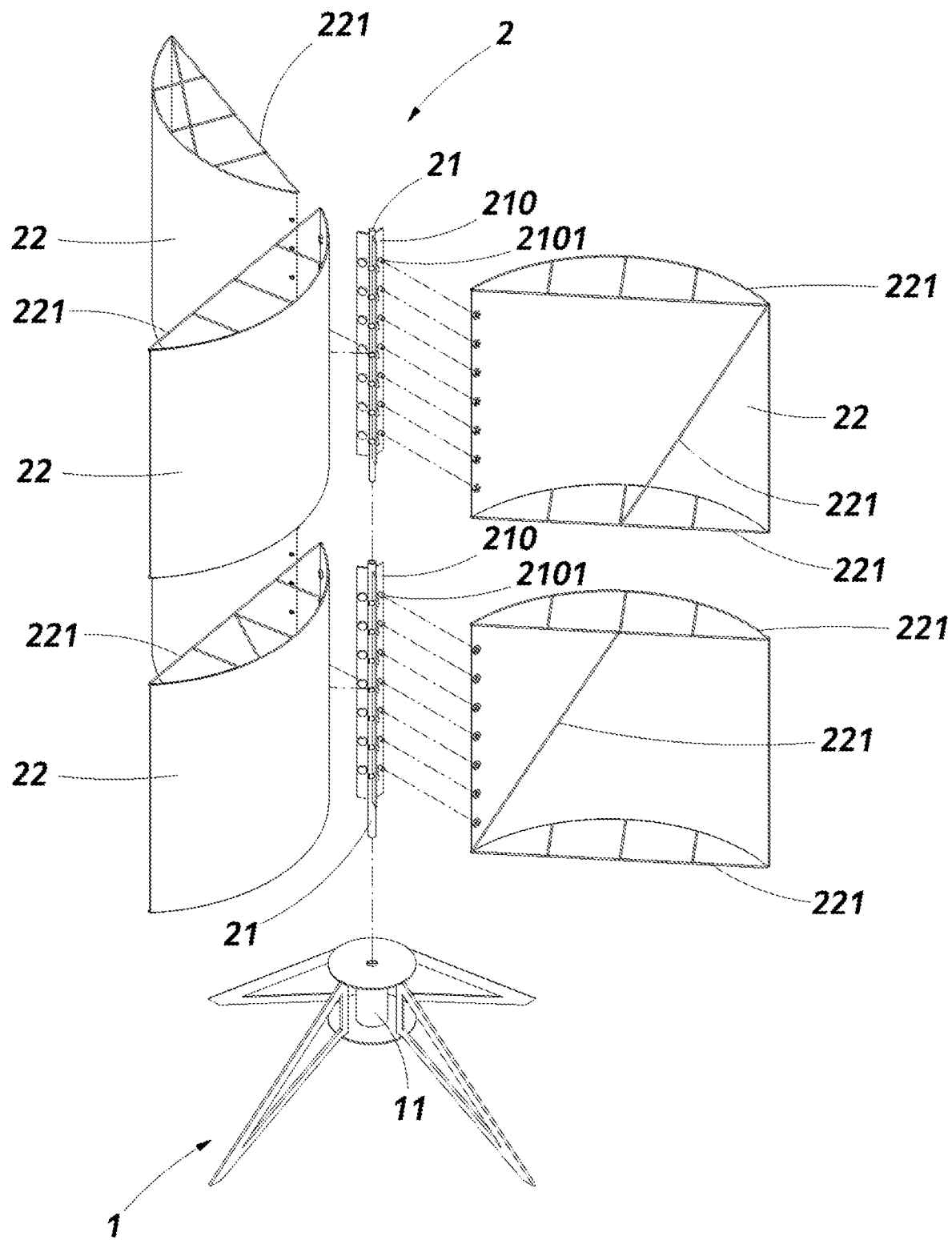
FIG. 5B is a vertical decomposition diagram of another embodiment of two blade sets at least with support body of the present invention.
Figure 6A:
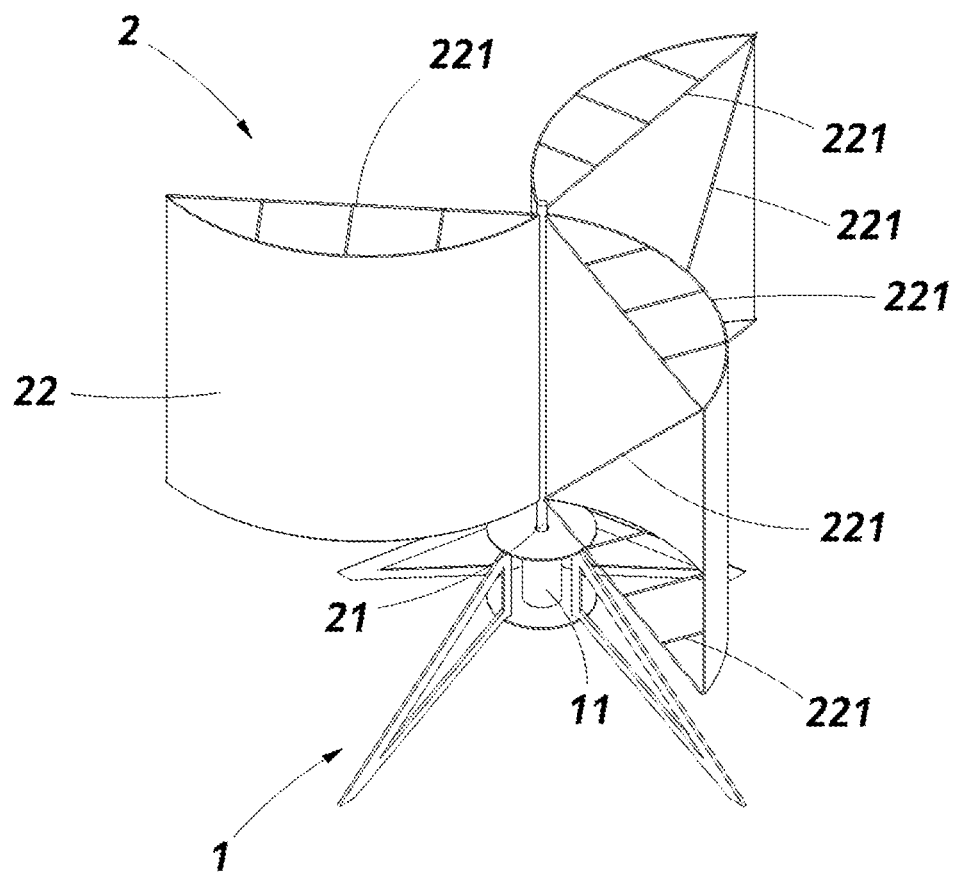
FIG. 6A is a vertical composition diagram of another blade opposite angle with support body of the present invention in FIG. 5A.
Figure 6B:
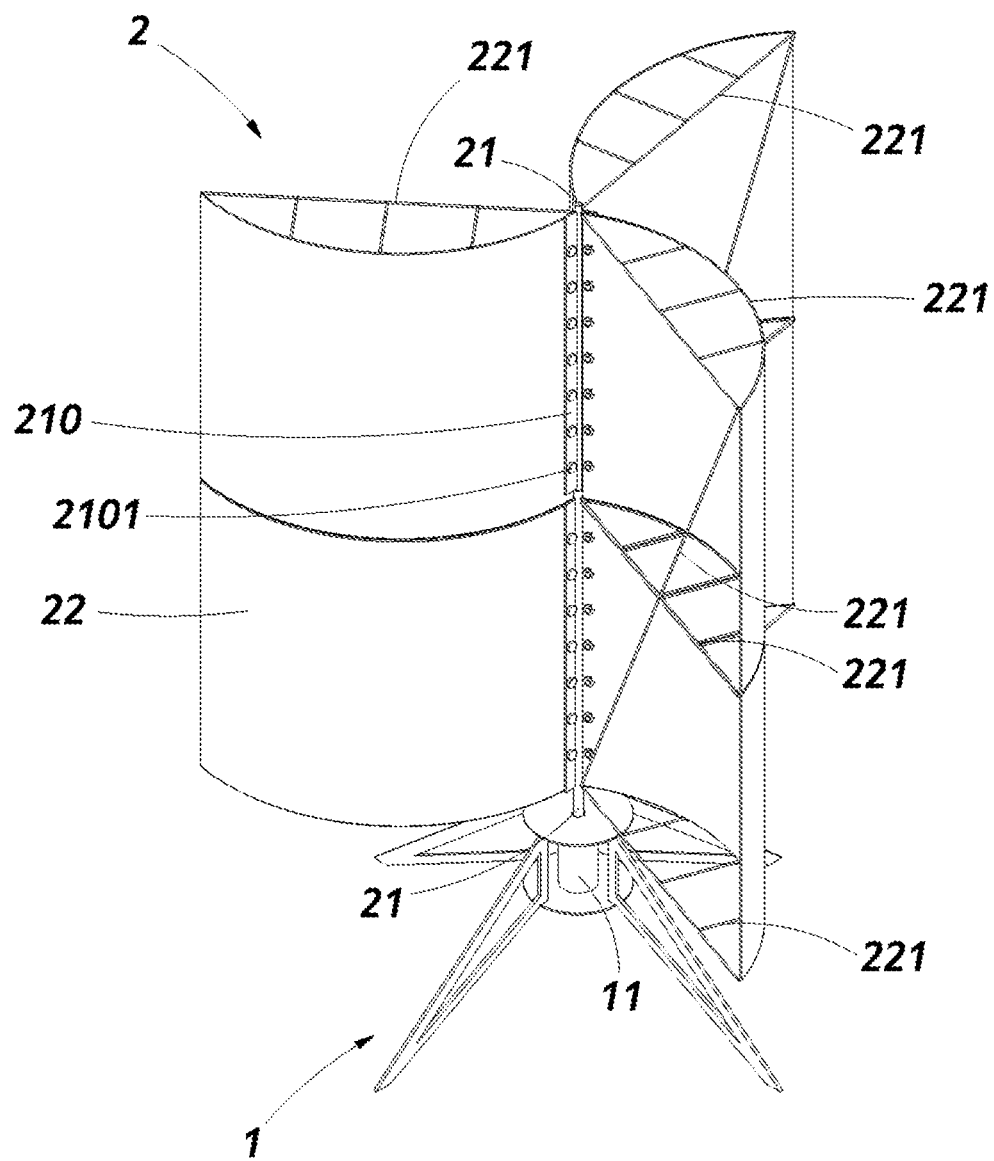
FIG. 6B is a vertical composition diagram of another blade opposite angle with support body of the present invention in FIG. 5B.
Figure 7A:
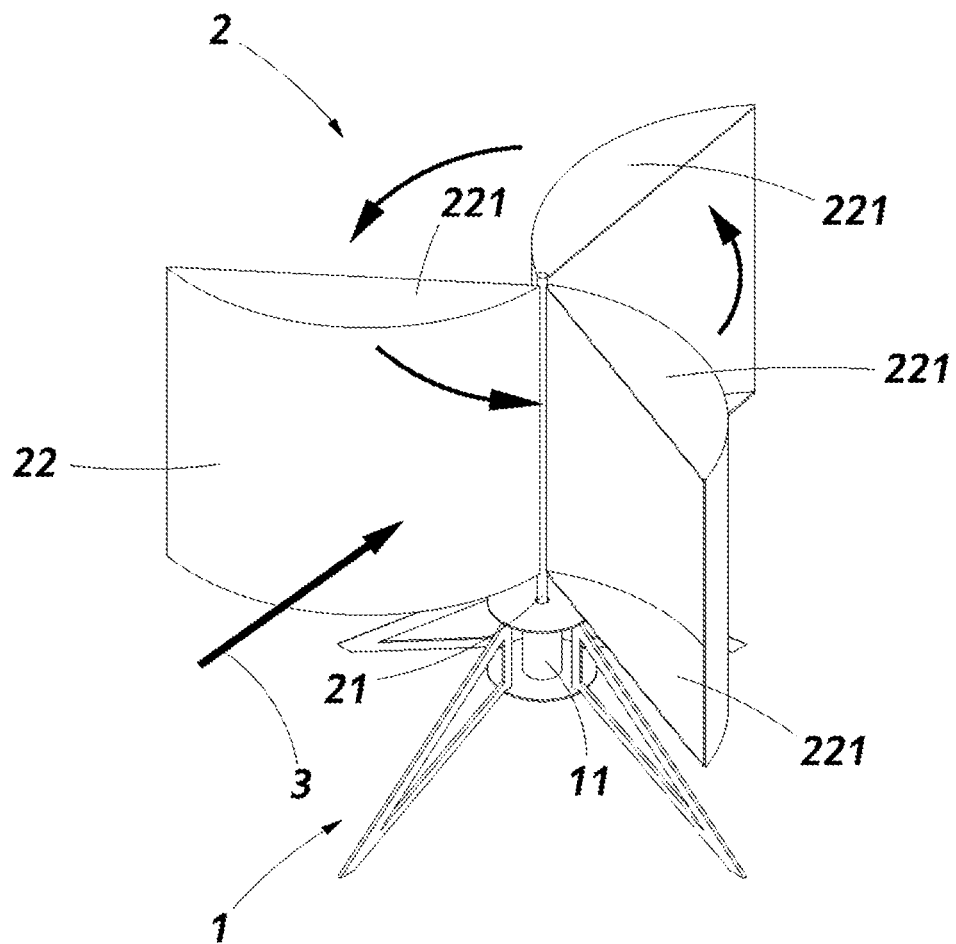
FIG. 7A shows the embodiment of FIG. 2A in which the blade set is in operation when subject to wind from any direction.
Figure 7B:
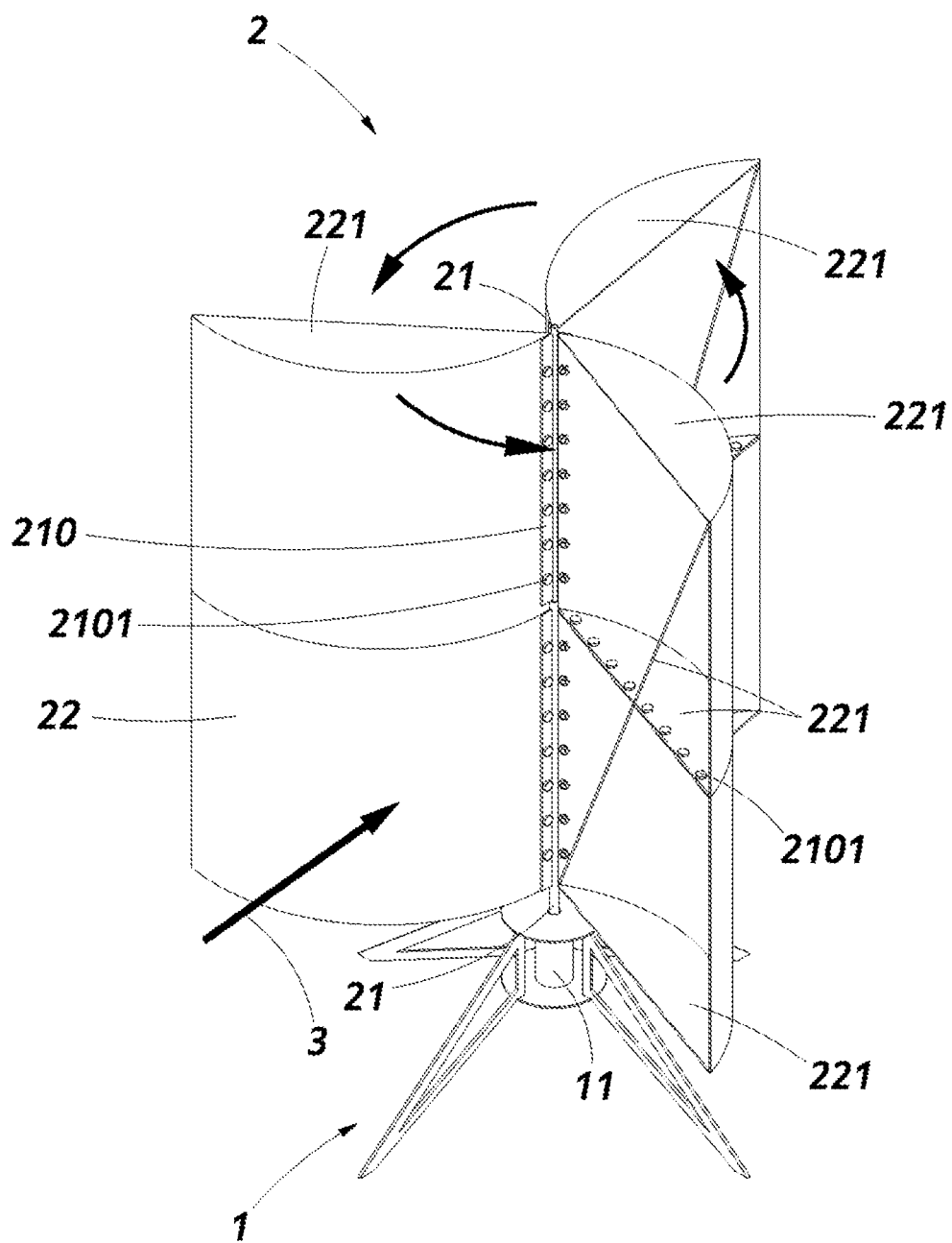
FIG. 7B shows the embodiment of FIG. 2B in which the blade set is in operation when subject to wind from any direction.

Referring to FIG. 1A, FIG. 1B, FIG. 2A, FIG. 2B, FIG. 3A, FIG. 3B, FIG. 4A, FIG. 4B, FIG. 5A, FIG. 5B, FIG. 6A, FIG. 6B, FIG. 7A and FIG. 7B, FIG. 1A is a vertical decomposition diagram of a single blade set with a support body of the present invention; FIG. 1B is a vertical decomposition diagram of two blade sets at least with support body of the present invention; FIG. 2A is a vertical composition diagram of a single blade set with a support body of the present invention; FIG. 2B is a vertical composition diagram of two blade sets at least with support body of the present invention; FIG. 3A is a vertical decomposition diagram of a single blade set of the present invention; FIG. 3B is a vertical decomposition diagram of another embodiment of a single blade set of the present invention; FIG. 4A is a vertical composition diagram of a single blade set of the present invention; FIG. 4B is a vertical composition diagram of another embodiment of a single blade set of the present invention; FIG. 5A is a vertical decomposition diagram of another embodiment of a single blade set with support body of the present invention; FIG. 5B is a vertical decomposition diagram of another embodiment of two blade sets at least with support body of the present invention; FIG. 6A is a vertical composition diagram of another blade opposite angle with support body of the present invention in FIG. 5A; FIG. 6B is a vertical composition diagram of another blade opposite angle with support body of the present invention in FIG. 5B; FIG. 7A is an embodiment diagram that the blade set is subjected to wind in any direction and is enabled to be in FIG. 2A of the present invention; FIG. 7B is an embodiment diagram that the blade set is subjected to wind in any direction and is enabled to be in FIG. 2B of the present invention. The present invention is applied to a small vertical wind-driven generator blade. In a preferred embodiment, the present invention comprises: a bracket 1 with a generator unit 11 therein, the upper end of the bracket 1 is provided with a blade set 2, the blade set 2 includes a connecting shaft 21 and two blades 22 at least (three blades 22 are preferred), and a lower end of the connecting shaft 21 of the lowermost blade set 2 is connected to the generator unit 11, and the connecting shaft 21 is provided with two blades 22 at least (three blades 22 are preferred) axially around the upper end of the bracket, they are radial and curved in a concave arc shape at the same direction. However, the present invention is not limited thereto. The blade set 2 can be extended in the length and the height direction. The single blade set 2 is small, and can be welded or integrally connected to the connecting shaft 21 and two blades 22 at least (three blades 22 are preferred) (as shown in FIG. 1A, FIG. 2A, FIG. 3A, FIG. 3B, FIG. 4A, FIG. 4B, FIG. 5A, FIG. 6A and FIG. 7A), the blade set 2 needs two blades 22 at least (three blades 22 are preferred), one end at least is not provided with or provided with a support body 221 (as shown in FIG. 1A, FIG. 2A, FIG. 5A, FIG. 6A and FIG. 7A) as required or the opposite angle of two blades 22 at least (three blades 22 are preferred) is not provided with or provided with a support body 221 (not shown in diagram) as required. Referring to the present invention, an embodiment of a large vertical wind-driven generator blade (as shown in FIG. 1B, FIG. 2B, FIG. 5B, FIG. 6B and FIG. 7B), the support body 221 of two blades 22 at least (three blades 22 are preferred) is a flake or a strip at least, but the present invention is not limited thereto. The blade set 2 has two blades 22 at least (three blades 22 are preferred) curved in a concave arc shape. The angle of the concave arc shape is greater than 0° to 80° or 80° to 90° or greater than 90° to less than 360°, wherein the ideal angle is 90°.

For the purposes described above, the present invention is applied to an embodiment of a medium or large vertical wind-driven generator blade, comprises: a bracket 1 with a generator unit 11 therein, wherein: the upper end of said bracket is provided with a blade set 2, the blade set 2 includes a connecting shaft 21, two connecting pieces 210 and two blades 22 at least (three blades 22 are preferred), and a lower end of the connecting shaft 21 of the lowermost blade set 2 is connected to the generator unit 11, and the connecting shaft 21 is provided with axially around the upper end of the bracket 1, two connecting pieces 210 at least are connected with two blades 22 at least (three blades 22 are preferred) through fixture 2101 and curved in a concave arc shape at the same direction. Each blade 22 is assembled by any unit length and any height in the unit blade 22 under the safety, technology and cost according to the requirement, and can be extended into a one large blade of one unit (inclusive) or more in the direction of length and height, and assembled into a vertical wind-driven generator with two large blades at least (three large blades are preferred), the fixture 2101 can be a screw or a rivet, but the present invention is not limited thereto, and the blade set 2 has two blades 22 at least curved in a concave arc shape. The angle of the concave arc shape is greater than 0° to less than 360°, wherein the ideal angle is 90°. The blade set 2 has two blades 22 at least (three blades 22 are preferred) curved in a concave arc shape. The angle of the concave arc shape is greater than 0° to 80° or 80° to 90° or greater than 90° to less than 360°, wherein the ideal angle is 90°. Two blades 22 at least of the blade set 2 (three blades 22 are preferred) are not provided or are provided with a support body 221 (as shown in FIG. 1B, FIG. 2B, FIG. 5B, FIG. 6B and FIG. 7B) at one end at least as required, or opposite angle of two blades 22 at least (three blades 22 are preferred) is not provided with or provided with a support body 221 (as shown in FIG. 1B, FIG. 2B, FIG. 5B, FIG. 6B and FIG. 7B) as required. The support body 221 of two blades 22 at least is a flake or a strip at least. The support body 221 is sealed to one end at least of two blades 22 at least (three blades 22 are preferred) (as shown in FIG. 1B, FIG. 2B, FIG. 5B, FIG. 6B and FIG. 7B), and the support body 221 can be placed at opposite angle of two blades 22 at least (three blades 22 are preferred) (as shown in FIG. 1B, FIG. 2B, FIG. 5B, FIG. 6B and FIG. 7B). The shape of the support body 221 is numerous, it is impossible to enumerate, any shape of the support body 221 is in the protection scope of the present invention; the generated power of the blade set 2 is proportional to the volume of the two blades 22 at least (three blades 22 are preferred), and the volume is equal to the blade 22 swept area multiplied by the height of blade 22.

As described above, the blade of the present invention is applied to the small, medium or large vertical wind-driven generator, and the blade 22 and the support body 221 can be made of the iron, aluminum, glass fiber and carbon fiber, but the present invention is not limited thereto, except for the foregoing iron, aluminum, glass fiber and carbon fiber, other materials can also be used and belong the protection scope of the present invention. The material used for the support body 221 can be selected according to the size of the blade set 2 of the vertical wind-driven generator blade of the present invention; the generated power of the blade set 2 is proportional to the volume of two blades 22 at least (three blades 22 are preferred). In addition, the blade set 2 of the upper end of the bracket 1 of the present invention connected to the generator unit 11 can be started by wind 3 with a low wind speed of 1.5 m/s to 2.0 m/s (as shown in FIG. 7A and FIG. 7B) in any direction, and the blade set 2 can be combined into small (as shown in FIG. 1A, FIG. 2A, FIG. 3A, FIG. 3B, FIG. 4A, FIG. 4B, FIG. 5A, FIG. 6A and FIG. 7A), medium and large (as shown in FIG. 1B, FIG. 2B, FIG. 5B, FIG. 6B and FIG. 7B) wind-driven generator according to the requirement, For example, the unit length is used as any length, 1 m height is used as the basic unit, which can be combined into a height of 50 m, or a large blade set 2 of up to 50 m or more and 100 m or more under technical and safety permission. For example, if the power of the original horizontal wind-driven generator is 2000 kW, if the length of both two blades 22 at least of the blade set 2 of the vertical wind-driven generator blade of the present invention is 79 m and the combined height is 50 m, its generated power is 2000 kW*50=100,000 kW (0.1 million kW). Therefore, the length of both two blades 22 at least (three blades 22 are preferred) of the blade set 2 is 79 m and the combined height is 50 m, which is equal to the power of 50 conventional wind-driven generators with same length, if the length is 56 m and the generated power of the horizontal wind-driven generator is 1000 kW, 100 horizontal wind-driven generators are required; the power of the generator unit 11 of the bracket 1 can be 100 W, 1000 kW or 0.1 million kW depending on the size of the blade set 2, and changed according to the user's requirement. The generated power of the blade set 2 is proportional to the volume of the two blades 22 at least, and the volume is equal to the swept area of the blade 22 multiplied by the height of the blade 22 (the generated power of the horizontal wind-driven generator is proportional to the swept area of the blade).

If the blade set 2 of the present invention is large, it can be applied to the source of the national green energy and it can avoid the trouble of finding the wind field, reduce the land cost and reduce the impact on the general resident environment. The present invention also has the same safety stock concept as the general thermal power generation plant. The thermal power generation plant can run stably, which should rely on the safe stock of fuel, the present invention also has the safe stock, for example, safe stock electric power of 3 months, it can also set up a power storage field, such as a large battery, pumping and storage power generation plant, etc., the night power can be used to avoid the peak power, the power can be temporarily stored when northeast monsoon blows, there is safety stocks, the wind power generation plant can also run stably. The development of green power such as wind power can reduce the use of fuels such as oil, natural gas and coal. The oil, natural gas, coal and other fuels will have a greenhouse effect and PM2.5 and will cause great damage to the earth and human habitat. It is also a great danger to human health; if wind power can be continuously developed, it may affect the development of oil and coal. Some countries will worry about the development of oil and coal industry and the livelihood of production workers. They may hesitate to develop the wind power. They can suggest that the oil and coal industry is developed to the material technology. All of the wind-driven generator blades, airplanes and automobiles require carbon fiber materials made from petroleum, coal and other raw materials to achieve a win-win situation.

With this structure, the upper end of the bracket 1 with generator unit 11 is provided with one blade set 2 at least connected to the generator unit 11, and each blade set 2 includes a connecting shaft 21 or two connecting pieces 210 at least, and the connecting shaft 21 or the connecting piece 210 is provided with two blades 22 at least or a support body 221; in addition, it can be started at a low wind speed without the direction controller and the complicated direction change control mechanism of the horizontal wind-driven generator, and the blade set can be operated by the wind in any direction, and the blade of the horizontal wind-driven generator can only be extended in the length direction, and the blade cannot be extended to a high place to assemble the vertical wind-driven generator. The blades of the present invention can be extended and assembled into the vertical wind-driven generator at any length and any height in the unit blade 2 under the conditions of safety, technology and cost. It can save the cost to find the wind field, reduce the cost of land, reduce the impact on the general resident environment, and effectively increase the generated power and operation convenience, and it will greatly expand the utilization of the industry and it is novel and progressive.

Although the present invention has been described in terms of specific exemplary embodiments and examples, it will be appreciated that the embodiments disclosed herein are for illustrative purposes only and various modifications and alterations might be made by those skilled in the art without departing from the spirit and scope of the invention as set forth in the following claims.

What is claimed is:

1. A multi-layer vertical wind-driven generator set structure, comprising:
   a bracket with a generator unit, the upper end of the bracket is provided with a single layer blade set, the blade set comprises a connecting shaft and a plurality of blades, the blades range from two blades to six blades, and preferably three blades, and the lower end of the connecting shaft of the single layer blade set is connected to the generator unit, and the connecting shaft is axially provided with the blades around the upper end of the bracket, one end of the blade is connected to the connecting shaft through a connecting pieces, and an opposite end of the blade is not connected to the connecting shaft, and the blades are radially mounted to the connecting shaft, and the blades are formed into a concave arc shape with the direction of the arc of each blade facing in the same direction.

2. The multi-layer vertical wind-driven generator set structure according to claim 1, wherein the blade is not straight and is a curved arc shape, and the arc is greater than 0° and less than 360°.

3. The multi-layer vertical wind-driven generator set structure according to claim 1, wherein the blade set has three blades and may be two blades, four blades, five blades or six blades.

4. The multi-layer vertical wind-driven generator set structure according to claim 1, wherein the blade set is curved, the blades can be turned to rotate by a wind when a curvature of the blade is greater than 0° and less than 80°, the blades can be rotated by the wind when the curvature of the blade ranges from 80° to 100°, and the blades can be moved by the wind when the curvature of the blade is greater than 100° and les than 360°.

5. The multi-layer vertical wind-driven generator set structure according to claim 4, wherein a multi-layer blade set comprises multi-layer blades, and a bending direction of each layer of blades is same direction triad the multi-layer blades are evenly distributed along an axis.

6. A multi-layer vertical wind-driven generator set structure, comprising:
   a bracket or a station, wherein a generator unit is disposed in the station, the upper end of the bracket or the station is provided with a multi-layer blade set, the multi-layer blade set comprises a connecting shaft, a connecting piece and a plurality of blades, the blades range from two blades to six blades, and preferably three blades, and the lower layer of the connecting shaft of the multi-layer blade set is connected to the generator unit, and the connecting shaft is axially provided with the blades around the upper end of the bracket, one end of the blade is connected to the connecting shaft, and an opposite end of the blade is not connected to the connecting shaft, each blades curved concaved shape is oriented in the same direction, each blade forms a unit that extends along a length to increase a length of the blade, and is assembled layer by layer in a height direction to form the multi-layer blade set with more than two units.

7. The multi-layer vertical wind-driven generator set structure according to claim 6, wherein each blade is connected to the connecting piece through a screw, a screw cap, and connecting piece is connected to the bearing through welding, and the bearing is integrally formed.

8. The multi-layer vertical wind-driven generator set structure according to claim 7, when there is only a single-layer blade, it is for small vertical wind turbines, and a length of the blades is within 60 cm.

9. The multi-layer vertical wind-driven generator set structure according to claim 6, wherein a vertical wind turbine power $E \leq \frac{1}{2}(ptshv3)$, wherein p is air density, which is 1.118 kg/m3 when a temperature is 15 degrees, t is time, s is an area of a circle, which is $L^2 \cdot \pi$, wherein L is blade length, h is a blade height, and v is wind speed.

10. The multi-layer vertical wind-driven generator set structure according to claim 6, wherein the generated power of the multi-layer blade set is proportional to the volume of the plurality of blades, and the volume is equal to the plurality of blade swept area multiplied by a height of the plurality of blade.

\* \* \* \* \*